US012428239B2

(12) United States Patent
Demir et al.

(10) Patent No.: US 12,428,239 B2
(45) Date of Patent: Sep. 30, 2025

(54) SORTING CONVEYOR AND CONVEYING CART FOR A SORTING CONVEYOR

(71) Applicants: Gebhardt Foerdertechnik GmbH, Sinsheim (DE); Koerber Supply Chain GmbH, Bad Nauheim (DE)

(72) Inventors: Halit Demir, Sinsheim (DE); Marco Gebhardt, Sinsheim (DE)

(73) Assignees: Gebhardt Foerdertechnik GmbH, Sinsheim (DE); Koerber Supply Chain GmbH, Bad Nauheim (DE)

( * ) Notice: Subject to any disclaimer, the term of this patent is extended or adjusted under 35 U.S.C. 154(b) by 409 days.

(21) Appl. No.: 18/000,371

(22) PCT Filed: Jul. 16, 2021

(86) PCT No.: PCT/DE2021/200095
§ 371 (c)(1),
(2) Date: Nov. 30, 2022

(87) PCT Pub. No.: WO2022/022786
PCT Pub. Date: Feb. 3, 2022

(65) Prior Publication Data
US 2023/0219767 A1    Jul. 13, 2023

(30) Foreign Application Priority Data
Jul. 28, 2020   (DE) .................... 10 2020 209 505.1

(51) Int. Cl.
*B65G 43/08*    (2006.01)
(52) U.S. Cl.
CPC ...... *B65G 43/08* (2013.01); *B65G 2203/0266* (2013.01)

(58) Field of Classification Search
CPC .................. B65G 43/08; B65G 2203/0266
(Continued)

(56) References Cited

U.S. PATENT DOCUMENTS 3,912,071 A    10/1975   Nielsen
5,638,938 A *  6/1997   Lazzarotti ............. B07C 1/02
                                                    198/444
(Continued)

FOREIGN PATENT DOCUMENTS

CN    207434431 U    6/2018
DE    101 27 127 A1  1/2003
(Continued)

OTHER PUBLICATIONS

DE102012010056 (Year: 2013).*
(Continued)

*Primary Examiner* — Gene O Crawford
*Assistant Examiner* — Lester Rushin, III
(74) *Attorney, Agent, or Firm* — Seed Intellectual Property Law Group LLP

(57) ABSTRACT

A sorting conveyor, which may be a cross-belt sorter, comprises a basic structure, a guide element arranged on the basic structure, and at least one conveying cart configured to be conveyed along the guide element of the sorting conveyor in a conveying direction. The sorting conveyor further includes a measuring device configured to monitor at least one operating state of the conveying cart and/or of the guide element.

13 Claims, 3 Drawing Sheets

(58) Field of Classification Search
USPC .................................................. 198/460.1
See application file for complete search history.

(56) References Cited

U.S. PATENT DOCUMENTS

| | | | |
|---|---|---|---|
| 6,273,268 B1 | 8/2001 | Axmann | |
| 9,321,594 B2 | 4/2016 | Droste et al. | |
| 2017/0283183 A1* | 10/2017 | Erceg | B65G 43/02 |
| 2021/0292099 A1* | 9/2021 | Droste | B07C 3/08 |

FOREIGN PATENT DOCUMENTS

| | | |
|---|---|---|
| DE | 10 2012 010 056 A1 | 11/2013 |
| DE | 10 2018 006 014 A1 | 1/2020 |
| EP | 0 930 248 A2 | 7/1999 |

OTHER PUBLICATIONS

International Search Report for Application No. PCT/DE2021/200095, date of mailing Nov. 23, 2021, 2 pages.
International Preliminary Report and Written Opinion for Application No. PCT/DE2021/200095, date of issuance Jan. 31, 2023, 8 pages.

\* cited by examiner

SORTING CONVEYOR AND CONVEYING CART FOR A SORTING CONVEYOR

BACKGROUND

Technical Field

The present disclosure relates to a sorting conveyor, in some cases a cross-belt sorter.

Furthermore, the present disclosure relates to a conveying cart for a sorting conveyor, in some cases a cross-belt sorter.

Description of the Related Art

Sorting conveyors or distributing conveyors are piece goods sorting systems for "identifying piece goods arriving in a random order on the basis of predetermined distinguishing features and for distributing them to targets that are set according to the respective requirements" (see VDI Guideline 3619). In the process, classification takes place in some cases according to performance. Highest throughputs with more than 10,000 sorted goods per hour are achieved, for example, by so-called cross-belt sorters.

The usual basic structure of the mentioned sorters comprises, as illustrated in FIG. 1, a sorting line 1, wherein successive discharge stations 2 (end points) and feeding stations (not shown) are arranged along this sorting line 1. Conveying carts 3, often also referred to as carriers, are successively guided and driven on the sorting line 1. In the case of cross-belt sorters, the conveying carts 3 have belt conveyors 4 that can be driven transversely to the conveying direction for feeding and discharging the sorted good, as shown by way of example in FIG. 1.

Sorting conveyors of the type in question here are made up of a large number of carriers. Usually, the individual carriers of a sorting conveyor have a left-handed and a right-handed roller assembly, each with a plurality of rollers, which in operation contact two guide elements of the sorting conveyor running along the sorting line at a defined distance from one another. The guide elements are usually formed as guide tubes with a substantially circular cross-section. The rollers function either as running rollers or as guide/support rollers for the conveying cart. While the running rollers rest on and roll on the guide tubes, the guide/support rollers hold the cart in position. A coupling rod, which is located for example at the end of each carrier, forms the connecting element between two respective adjacent carriers. As a result, the entire sorter can become an endless chain of a plurality of conveying carts.

In the prior art, the driving behavior of the carriers often proves to be problematic, wherein said driving behavior is negatively influenced, for example, by wear on the guide rollers of the carriers or deformations on the carriers or on the guide elements. In conventional distribution systems, in some cases cross-belt sorters, such effects, for example, increased wear on the guide rollers of the carriers or deformation on the carriers, are often noticed too late since the affected areas are usually not accessible during operation. Accordingly, investigations in this regard take place exclusively within the framework of fixed maintenance intervals. Accordingly, such maintenance intervals are to be performed frequently. In addition, there is currently no way to detect major deformations on the carrier in a timely manner, which can lead to major consequential damages under certain circumstances.

BRIEF SUMMARY AND INITIAL DESCRIPTION

The present disclosure is therefore directed to a sorting conveyor along with a conveying cart for a sorting conveyor of the aforementioned type configured in such a way that the maintenance effort and the downtimes of the sorting system are reduced.

In at least one embodiment, a sorting conveyor according to the present disclosure comprises a basic structure, a guide element arranged on the basic structure, and at least one conveying cart that is configured to be conveyed along the guide element of the sorting conveyor in a conveying direction. The sorting conveyor includes a measuring device for monitoring at least one operating state of the conveying cart and/or the guide element. Further, in at least one embodiment, a conveying cart for a sorting conveyor as described herein, in some cases a cross-belt sorter, comprises a cart frame and is configured to be conveyed along at least one guide element of the sorting conveyor in a conveying direction.

Aspects of the sorting conveyor can be achieved by installing, in the sorting conveyor, a measuring device which is configured to monitor at least one operating state of the conveying cart and/or of the guide element. By integrating the measuring device into the sorting conveyor, certain operating states can be checked outside of defined maintenance intervals, in some cases even during regular operation of the entire system. With a sorting conveyor as described herein, the disadvantages mentioned at the beginning can thus be avoided or at least significantly reduced. In some cases, the maintenance effort, costs, and downtimes of the sorting system, for example as part of predictive maintenance, can be significantly reduced by way of a measuring or testing device integrated into the sorting conveyor.

According to at least one advantageous embodiment, it can be provided that the measuring device is indirectly or directly assigned to the basic structure. In this way, on one hand, there is the possibility of simple pre-assembly of the measuring device in individual modules that make up the sorting conveyor. On the other hand, the basic structure of the sorting conveyor, due to the fixed floor-side mounting and rigid structure, represents a suitable reference object against which measurements can be carried out with a high degree of accuracy.

In terms of design, the measuring device can comprise a working cylinder which is configured to act between the basic structure, on one hand, and a reference component mounted on the conveying cart in a defined installation position, on the other hand. It can be provided that the cylinder piston can be subjected to a constant working force and the deflection of the cylinder, i.e., the positions of the cylinder piston, is measured. In this way, changes in the distance between the reference component and the basic structure can be detected with a high degree of accuracy. In concrete terms, a position transmitter which on the one hand measures the position of the cylinder piston transverse to the conveying direction and also transmits the measured position data to a control component of the measuring device could, for example, be assigned to the working cylinder for this purpose.

In principle, the working cylinder can be operated with different working media depending on the specific application situation. In some cases, the working cylinder can be designed as a pneumatic cylinder, a hydraulic cylinder or an electric cylinder, for example.

In order to establish reliable, low-wear contact between the measuring device and the reference component, it may be provided that the reference component is formed as a round body rotatably arranged on a cart frame of the conveying cart. The term "round body" is to be understood in a broad sense and includes in some cases wheels, rollers, rolls or the like. Such a design of the reference component allows it to roll on a suitably formed surface coupled directly or indirectly to the working cylinder of the measuring device when the conveying cart passes the measuring device, without disturbing the smooth running of the conveying cart.

According to at least one embodiment, the specified surface may be formed as a friction strip that is directly or indirectly coupled to the piston rod of the working cylinder. The positioning of the friction strip in relation to the basic structure of the sorting conveyor is selected in such a way that the friction strip is pressed against the reference component when the conveying cart passes.

With regard to the safest and most trouble-free operation of the sorting conveyor, it proves to be advantageous if the measuring device interacts with the sorting conveyor or the conveying carts only during the actual performance of measurements. For this purpose, it can be provided that the friction strip (or generally the surface that comes into contact with the reference component on the conveying cart) is arranged on a support arm coupled to the piston rod of the working cylinder via a pivoting or folding mechanism. The pivoting or folding mechanism can be designed in such a way that the support arm can be pivoted or folded from a measuring position, in which the friction strip contacts the reference component of a passing conveying cart, into a rest position, in which the friction strip does not contact the reference component of a passing conveying cart, and vice versa. A locking device can be provided for fixing in the measuring position, in order to ensure reproducible measurement results.

According to at least one embodiment, the fact that sorting conveyors of the type in question here usually have a discharge mechanism is exploited. This discharge mechanism comprises a friction strip assigned to the basic structure of the respective modules of the sorting conveyor and, correspondingly, on the side of the conveying cart, a drive or friction wheel arranged below the cart frame of the conveying cart. If a piece good transported by a conveying cart is to be discharged at a certain position, the friction strip of the respective module is brought into a position in which it contacts the drive or friction wheel of the conveying cart. In the process, the drive or friction wheel forms the drive for the discharge characteristic of the conveying cart, i.e., for example, the cross belt in the case of a cross-belt sorter or the tilt tray in the case of a tilt tray sorter.

According to at least one embodiment, the drive or friction wheel, which is already present on the conveying cart in any event for actuating the discharge characteristic of the conveying cart, is used in an additional function as the reference component of the measuring device. This has the advantage that no modifications need to be made to the conveying cart of the sorting conveyor to implement the present invention. However, with this embodiment, it must be ensured that the conveying cart is not loaded with material to be conveyed during the measurement process, since the cross belt or the tilt tray of the conveying cart is driven or activated during the measurement, which would cause any material to be conveyed to be discharged unintentionally.

With regard to effective handling of the measurement data, it can be provided that the measuring device has a decentralized control component which is configured to receive the position information of the cylinder piston. The decentralized control component can also be configured to evaluate the received position information locally using predefinable algorithms. Alternatively, it may be provided that the received measurement data are merely preprocessed by the decentralized control component and transmitted to a higher-level controller for actual data evaluation. In some cases, a higher-level controller can be used to assign the measured values to the individual conveying carts of the sorting conveyor since the controller knows which conveying cart is traveling along a specific measuring device of the sorting conveyor at which point in time. In some cases, the exact positions of the reference components, assigned to the individual carriers, may be measured and evaluated via the controller over the entire runtime of the system.

As part of the data evaluation, it may be provided that a wear condition of guide rollers of the respective conveying cart and/or a wear condition of the drive/friction wheel of the conveying cart acting as a reference component is, for example, derived from the position data. This is based on the consideration that when the lining of, for example, the lateral guide roller of the conveying cart is worn, its diameter is reduced. Accordingly, the cylinder piston of the working cylinder continues to exit the cylinder when a constant force is applied, which can be detected as a change in the position of the cylinder piston.

In addition or alternatively, it may be provided as part of the data evaluation that information regarding deformations on the entire conveying cart or on individual components of the conveying cart are derived from the position information using predefinable algorithms. A detection of major position deviations of the cylinder piston of the working cylinder within a short time span may be defined as an indication of such deformations. In this respect, both the size of the position deviations and the length of the time span may be defined by corresponding threshold values.

In order to further improve the information content of the measured position data, it may be provided that a plurality of measuring devices is arranged along the sorting line of the sorting conveyor. Within the framework of a preferred embodiment, at least one of the measuring devices accesses the reference component of the conveying cart from the right-hand side as viewed in the conveying direction, while at least one other of the measuring devices accesses the reference component of the conveying cart from the left-hand side as viewed in the conveying direction. In this way, different wear of the guide rollers on both sides of the sorting conveyor (as viewed in the conveying direction) can be reliably detected.

Also described herein is a conveying cart for a sorting conveyor, in some cases a sorting conveyor as described herein. Accordingly, the conveying cart includes a reference component that is mounted on the cart frame in a defined installation position in order to cooperate directly or indirectly with a working cylinder of a measuring device of the sorting conveyor, which working cylinder can be subjected to a constant working force.

In the manner in accordance with the present disclosure, it has been recognized advantageous to include a reference component, which cooperates with the measuring device, on the conveying cart in a defined installation position. Due to the defined installation position, it is possible to draw conclusions about certain operating states of the conveying cart and/or of the guide elements of the conveying cart from position deviations of the working cylinder of the measuring device. As a result, predictive maintenance can thus be implemented with the conveying cart according to the invention, which significantly reduces the maintenance effort, costs, and downtimes of the sorting system.

It is noted that the conveying cart according to the present disclosure can have the features of the conveying cart described with respect to the sorting conveyor as described herein, so that a corresponding combination of features expressly constitutes a part of the disclosure described herein.

BRIEF DESCRIPTION OF THE SEVERAL VIEWS OF THE DRAWINGS

There are various possibilities for designing and developing the teachings of the present disclosure in an advantageous manner. In this regard, reference is made, on one hand, to the claims and, on the other hand, to the following explanation of exemplary embodiments of the present disclosure with reference to the drawings. Generally preferred embodiments and developments of the teachings are also explained in conjunction with the explanation of the preferred exemplary embodiments of the present disclosure with reference to the drawings. The following are shown in the drawings:

In the figures, unless otherwise indicated, the same reference signs denote the same or similar components or parts.

DETAILED DESCRIPTION

Figure 1:
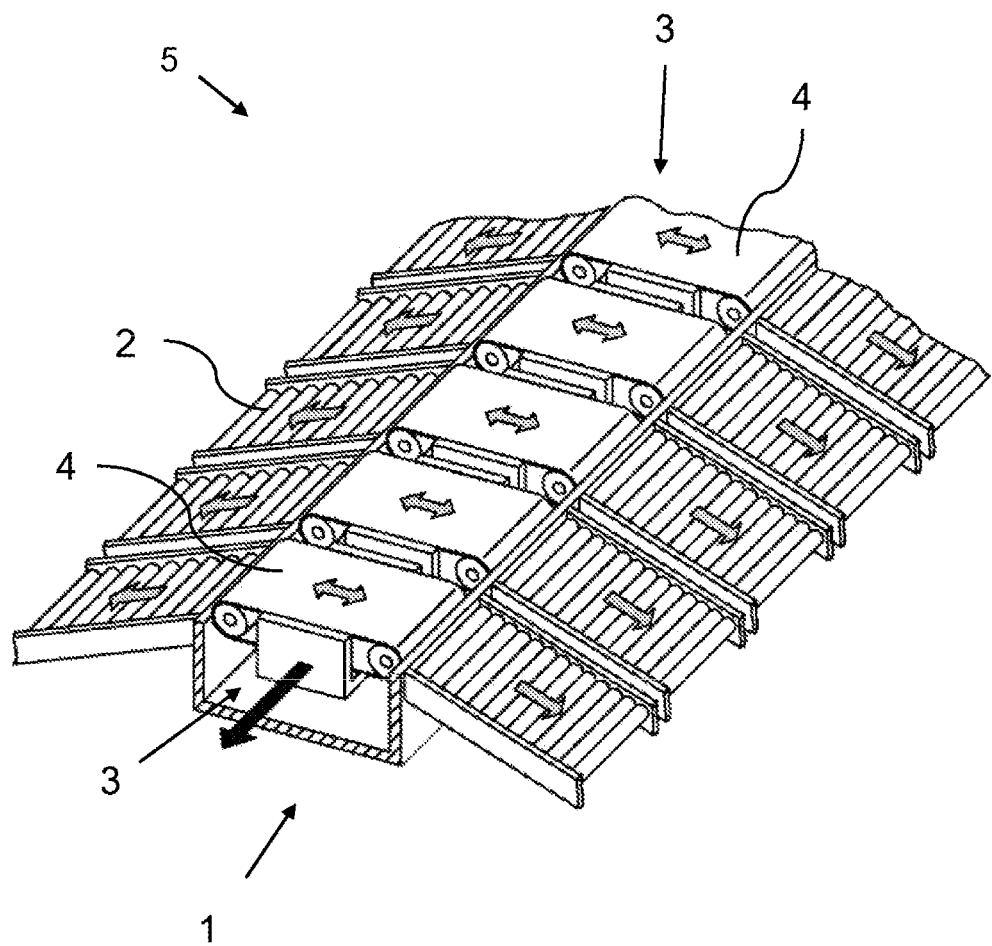
FIG. 1 is a schematic illustration of the general structure of a cross-belt sorter according to the prior art.
Figure 2:
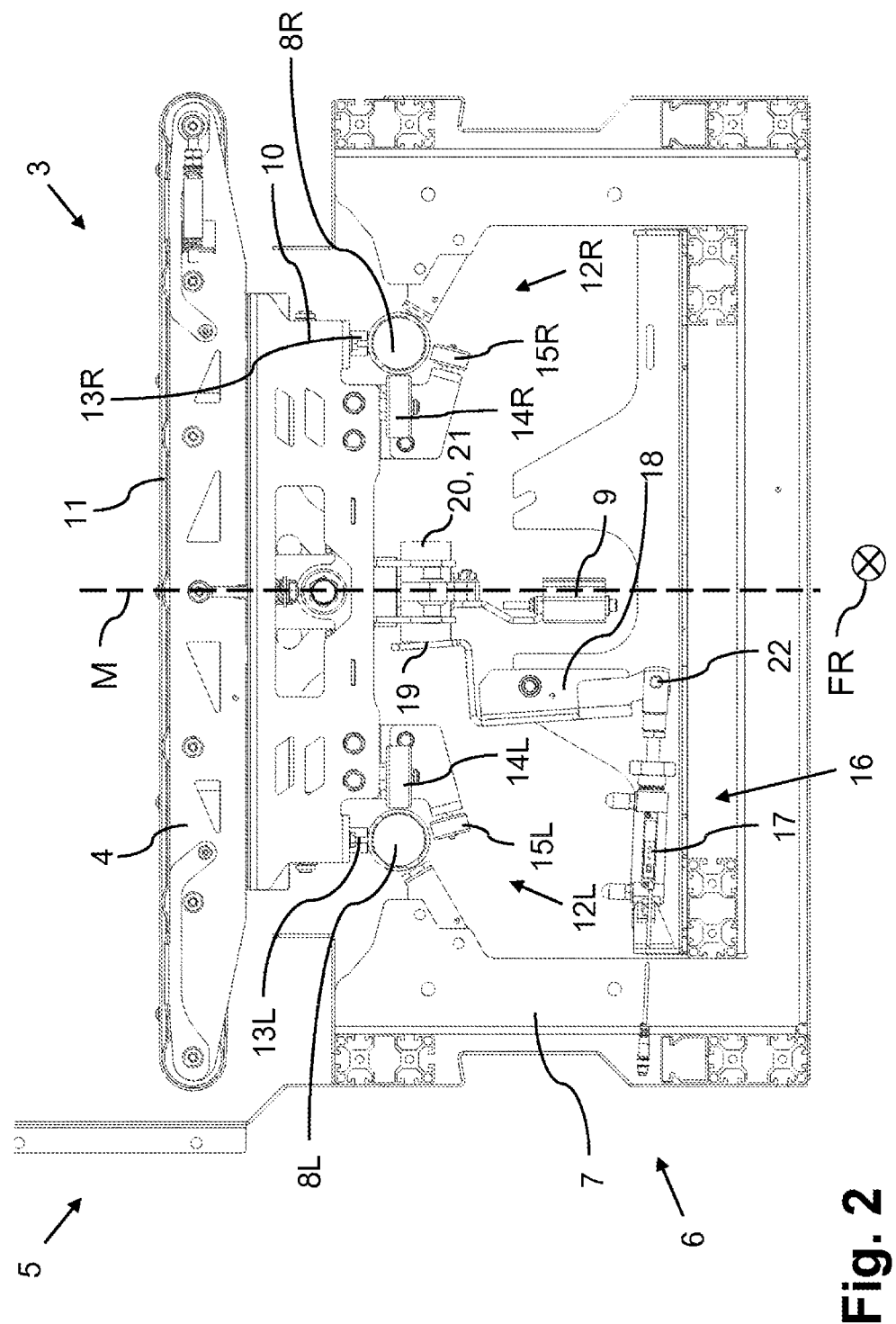
FIG. 2 is a sectional view of a sorting conveyor with a conveying cart and with a measuring device in an active measuring position.

FIG. 2 schematically shows in a sectional view a basic installation position of a conveying cart 3 within a sorting conveyor 5 (hereinafter also referred to as sorting system or distributing conveyor). The sorting conveyor 5 comprises a basic structure 6 which is arranged on a base on the floor side and, in the embodiment shown, is formed as a rack 7 with a substantially U-shaped cross-section. Inside the cross-section, two guide elements 8L, 8R running symmetrically to a central axis M of the sorting conveyor 5 along the sorting line are provided for the conveying carts 3. For conveying the conveying cart 3, a driven rubber block chain 9 preferably runs on the central axis M of the sorting conveyor 5, to which rubber block chain the conveying carts 3 are connected and which rubber block chain serves as a drive chain for the conveying carts 3. In FIG. 2, the illustration is selected such that the conveying direction FR points into the drawing plane.

The conveying cart 3 comprises a cart frame 10 and a load-bearing element, arranged on the cart frame 10, for sorted goods. In the case of a cross-belt sorter, the load-bearing element, as shown in FIG. 2, is formed as a belt conveyor 4 with a belt 11 that can be actuated electrically or mechanically transversely to the conveying direction FR of the conveying cart 3 for feeding and discharging the sorted goods.

Two roller assemblies 12 are arranged on an underside of the cart frame 10, wherein one of the roller assemblies 12 is formed as a left-handed roller assembly 12L for cooperating with the left-handed guide element 8L as viewed in the conveying direction FR, and the other roller assembly 12 is formed as a right-handed roller assembly 12R for cooperating with the right-handed guide element 8R as viewed in the conveying direction FR. Left-handed and right-handed roller assemblies 12L, 12R are constructed in mirror symmetry to a mirror plane, wherein the mirror plane is defined by the conveying direction FR and the central axis M of the sorting conveyor 5.

In the illustrated exemplary embodiment, each of the two roller assemblies 12L, 12R comprises a respective running roller 13L, 13R, which contacts the respectively assigned guide element 8L, 8R from above and rolls thereon, thus enabling a rolling movement of the conveying cart 3 on the assigned guide element 8L, 8R. Furthermore, each of the two roller assemblies 12L, 12R comprises a lateral guide roller 14L, 14R, which contacts a lateral surface section of the respectively assigned guide element 8L, 8R and serves mainly to laterally stabilize the rolling movement of the conveying cart 3. Finally, each of the two roller assemblies 12L, 12R comprises a lower guide roller 15L, 15R that, in addition to providing a lateral support or stabilizing effect, acts in the sense of an anti-lift device that prevents the running rollers 13L, 13R from lifting off the guide elements 8L, 8R, caused, for example, by impacts or unevenness. It is understood that the present disclosure is not limited to the specific roller arrangement shown in FIG. 2.

In some cases, the lateral guide rollers 14L, 14R are subject to considerable wear, which often goes unnoticed because these rollers (and generally the region below the cart frame 10) are not accessible during the operation of the sorting conveyor 5. Generally, a corresponding examination is only carried out at specified maintenance intervals. Apart from increased wear, deformations that have occurred on a conveying cart, if left undetected, may possibly lead to major consequential damages.

Figure 3:
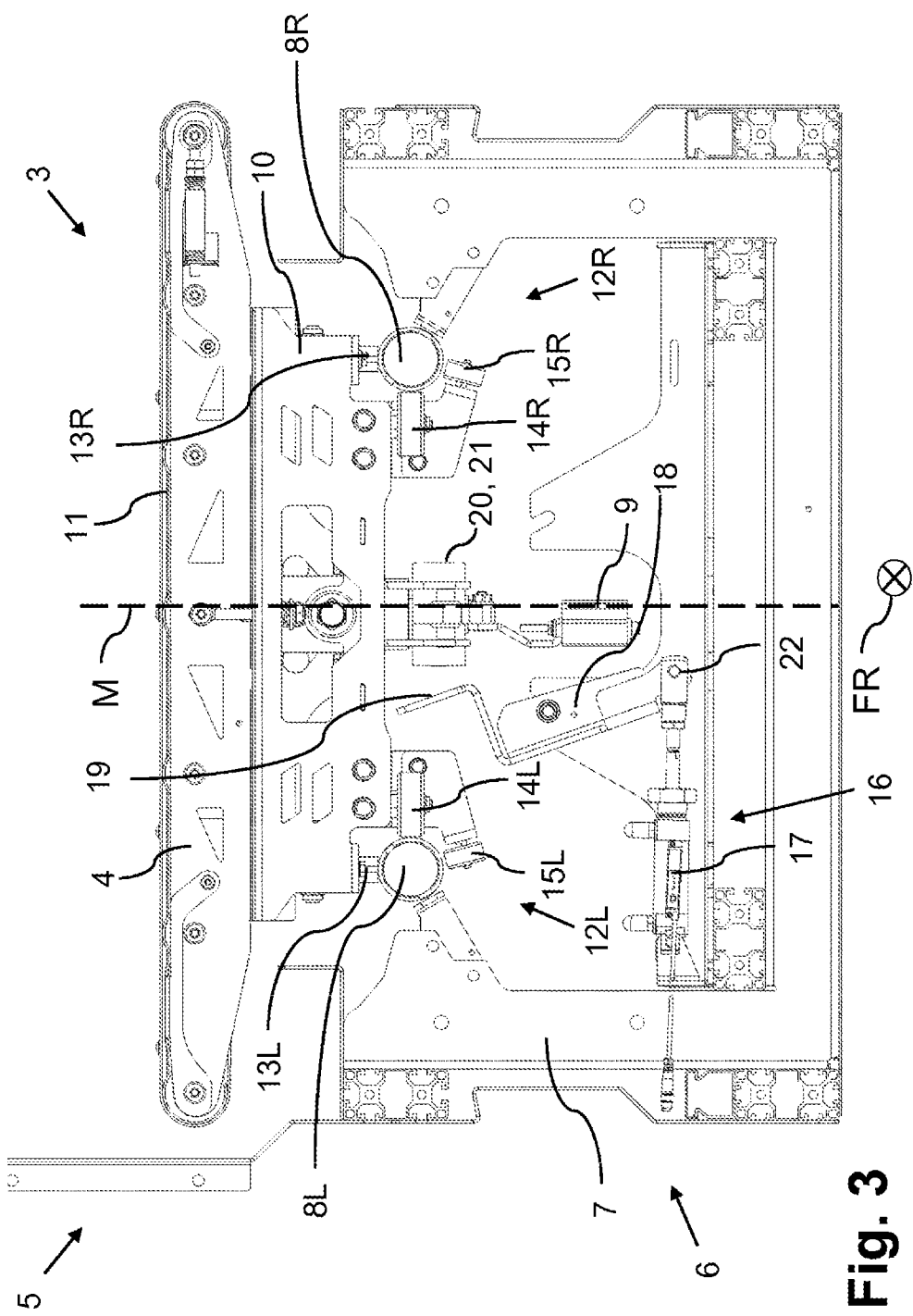
FIG. 3 is a sectional view of a sorting conveyor with a conveying cart and with a measuring device in a passive rest position.

The present disclosure provides a remedy in this regard by integrating an automatic measuring device into the sorting conveyor 5. FIGS. 2 and 3 show a module of a sorting conveyor with a measuring device 16 integrated according to the invention. While FIG. 2 shows the measuring device 16 in active operation, FIG. 3 shows the measuring device 16 in a passive rest position, as explained in detail below.

According to the illustrated exemplary embodiment, the measuring device 16 comprises a pneumatic working cylinder 17, which is indirectly or directly fixed at its one side to the basic structure 6 or the rack 7 of the module and is indirectly or directly coupled at its other side to a support arm 18. A friction strip 19 is arranged at the end of the support arm 18, which friction strip is configured to cooperate with a reference component 20 arranged on the cart frame 10 of the conveying cart 3 in a defined installation position.

The mode of operation of the measuring device 16 is such that, via the pneumatic cylinder 17, the support arm 18 with the friction strip 19 is pressed against the reference component 20 of the passing carrier 3 with a defined constant force. The reference component 20 is preferably formed as a round body (in some cases, a wheel or roller) so that the reference component 20 can roll on the friction strip 19 without negatively influencing the smooth running of the carrier 3 during the measurement. With the aid of a position transmitter on the pneumatic cylinder 17, the position of the rolling reference component 20 is measured transversely to the conveying direction FR, as indicated by the dashed arrow in FIG. 2, and is communicated to a decentralized or centralized higher-level controller (not shown).

In the exemplary embodiment shown in FIGS. 2 and 3, the reference component 20 is not a special additional component. Rather, the measuring device 16 is designed in such a way that the drive/friction wheel 21, which is present on the cart frame 10 of the conveying cart 3 in any event and is primarily used to drive the belt 11 of the belt conveyor 4, simultaneously functions as a reference component 20. In this case, it is important to ensure that during the measurement process, the carrier 3 is not loaded with material to be conveyed, since the belt on the carrier is driven during the measurement process and, accordingly, the material to be conveyed is discharged unintentionally.

The measured position data can be assigned to individual conveying carts 3 via a decentralized control component, which may be designed as a PLC controller, for example. For this purpose, the information available at the control component as to which conveying cart 3 passes the measuring device 16 at which point in time is used. Accordingly, the positions of the reference components 20, assigned to the individual carriers 3, may be measured and evaluated via the controller over the entire runtime of the system.

Based on suitable evaluation algorithms, the following states may, for example, be indirectly determined by continuously evaluating the positions of the reference components 20 of the individual carriers 3:

1. Wear of the lining on the lateral guide rollers 14L, 14R via the reduced diameter;
2. Wear of the lining on the lower drive/friction wheel 21 for the belt 11 of the conveying cart 3 via the reduced diameter;
3. Deformations on the entire carrier 3 or its components based on a detection of larger position deviations in a short time.

By way of a corresponding evaluation of the measurement data, conclusions may also be drawn regarding general irregularities that indicate unknown problems. It is also possible to indirectly determine other conditions that become apparent during the collection and evaluation of the measured position data.

As noted above, FIG. 3 shows the measuring device 16 in a rest position, in which the friction strip 19 does not contact the reference component 20 of a passing conveying cart 3. For this purpose, a pivoting or folding mechanism 22 is arranged between the working cylinder 17 and the support arm 18 and makes it possible to pivot or fold the support arm 18 together with the friction strip 19 away from the reference component 20. In this way, it can be achieved that the measuring device 16 only interacts with the sorting conveyor 5 or the conveying carts 3 during the actual performance of measurements, so that overall operation is as safe and trouble-free as possible.

With regard to other advantageous embodiments of the apparatus according to the invention, reference is made to the general part of the description and also to the accompanying claims in order to avoid repetitions.

Finally, it is expressly pointed out that the above-described exemplary embodiments of the apparatus according to the present disclosure serve only to explain the claimed teaching but do not restrict it to the exemplary embodiments. Moreover, the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

LIST OF REFERENCE SIGNS

1 Sorting line
2 Discharge station (end point)
3 Conveying cart
4 Belt conveyor
5 Distributing conveyor
6 Basic structure
7 Rack
8L, 8R Guide element
9 Rubber block chain
10 Cart frame
11 Belt
12L, 12R Roller assembly
13L, 13R Running roller
14L, 14R Lateral guide roller
15L, 15R Lower guide roller
16 Measuring device
17 Working cylinder
18 Support arm
19 Friction strip
20 Reference component
21 Drive/friction wheel
22 Pivoting/folding mechanism
FR Conveying direction

The invention claimed is:

1. A sorting conveyor, comprising:
a basic structure,
a guide element arranged on the basic structure,
at least one conveying cart configured to be conveyed along the guide element of the sorting conveyor in a conveying direction,
a measuring device configured to monitor at least one operating state of the conveying cart and/or of the guide element, wherein the measuring device comprises a working cylinder having a cylinder piston, and wherein the cylinder piston can be subjected to a constant working force and acts between the basic structure and a reference component mounted on the conveying cart in a defined installation position; and
a position transmitter assigned to the working cylinder, wherein the position transmitter is configured to determine the position of the cylinder piston.

2. The sorting conveyor according to claim 1, wherein the measuring device is indirectly or directly assigned to the basic structure.

3. The sorting conveyor according to claim 1, wherein the working cylinder is configured as a pneumatic cylinder, as a hydraulic cylinder, or as an electric cylinder.

4. The sorting conveyor according to claim 1, wherein the reference component is configured as a round body rotatably arranged on a cart frame of the conveying cart.

5. The sorting conveyor according to claim 1, wherein a piston rod of the working cylinder is coupled indirectly or directly to a friction strip such that the friction strip is pressed against the reference component when the conveying cart passes the measuring device.

6. The sorting conveyor according to claim 5, wherein the friction strip is arranged on a support arm coupled to the working cylinder via a pivoting or folding mechanism, wherein the pivoting or folding mechanism is configured to pivot or fold the support arm from a measuring position in which the friction strip contacts the reference component of the conveying cart passing the measuring device, into a rest position in which the friction strip does not contact the reference component of the conveying cart passing the measuring device, and vice versa.

7. The sorting conveyor according to claim 1, wherein the conveying cart further comprises a drive wheel arranged on a cart frame of the conveying cart, said drive wheel being configured to drive or activate a cross-belt or a tilt tray of the conveying cart by cooperating with a friction strip, wherein the drive wheel functions as the reference component.

8. The sorting conveyor according to claim 7, wherein the measuring device comprises a control component configured to receive position information of the cylinder piston and to derive a wear condition of guide rollers of the conveying cart and/or a wear condition of the drive wheel of the conveying cart from the received position information using predefinable algorithms.

9. The sorting conveyor according to claim 8, wherein the measuring device has a control component configured to derive information regarding deformations on the entire conveying cart or on individual components of the conveying cart from the received position information using predefinable algorithms.

10. The sorting conveyor according to claim 1, wherein a plurality of measuring devices is arranged along a sorting line of the sorting conveyor, wherein at least one of the plurality of measuring devices acts on the reference component from a direction to the right of a central axis of the sorting conveyor as viewed in the conveying direction, and at least one other of the plurality of measuring devices acts on the reference component from a direction to the left of the central axis of the sorting conveyor as viewed in the conveying direction.

11. A conveying cart for a sorting conveyor according to claim 1, wherein the conveying cart comprises a cart frame and is configured to be conveyed along the guide element of the sorting conveyor in the conveying direction, and wherein the reference component is mounted on the cart frame in the defined installation position in order to cooperate directly or indirectly with the working cylinder of the measuring device of the sorting conveyor.

12. The conveying cart according to claim 11, wherein the reference component is configured as a round body, which rolls on a friction strip coupled directly or indirectly to the working cylinder when the conveying cart passes the measuring device of the sorting conveyor.

13. The conveying cart according to claim 11, further comprising a drive wheel which is arranged on the cart frame and is configured to drive or activate a cross-belt or a tilt tray of the conveying cart by cooperating with a friction strip, wherein the drive wheel functions as the reference component.

* * * * *